(12) United States Patent
Drochon

(10) Patent No.: US 8,469,094 B2
(45) Date of Patent: Jun. 25, 2013

(54) ADDITIVE FOR CONTROLLING CEMENT SLURRY RHEOLOGY

(75) Inventor: Bruno Drochon, Cambridge (GB)

(73) Assignee: Schlumberger Technology Corporation, Sugar Land, TX (US)

( * ) Notice: Subject to any disclaimer, the term of this patent is extended or adjusted under 35 U.S.C. 154(b) by 441 days.

(21) Appl. No.: 12/740,265

(22) PCT Filed: Oct. 9, 2008

(86) PCT No.: PCT/EP2008/063558
§ 371 (c)(1), (2), (4) Date: Jul. 9, 2010

(87) PCT Pub. No.: WO2009/056430
PCT Pub. Date: May 7, 2009

(65) Prior Publication Data
US 2011/0042086 A1    Feb. 24, 2011

(30) Foreign Application Priority Data
Oct. 30, 2007    (EP) ..................................... 07119647

(51) Int. Cl.
*E21B 33/13* (2006.01)
*C04B 7/36* (2006.01)
*C09K 8/42* (2006.01)

(52) U.S. Cl.
USPC ........... 166/293; 166/300; 106/606; 106/634; 523/130

(58) Field of Classification Search
None
See application file for complete search history.

(56) References Cited

U.S. PATENT DOCUMENTS

| 4,967,839 | A | * | 11/1990 | Carpenter et al. ............. 166/293 |
| 5,567,750 | A | | 10/1996 | Schulze et al. |
| 6,350,808 | B1 | | 2/2002 | Schmitz et al. |
| 6,730,722 | B1 | | 5/2004 | Eck et al. |
| 2007/0112128 | A1 | | 5/2007 | Weitzel et al. |

* cited by examiner

*Primary Examiner* — Zakiya W Bates
(74) *Attorney, Agent, or Firm* — Michael Dae

(57) ABSTRACT

A cement composition for use in a wellbore comprising a cement blend and at least two polyvinylalcohols wherein the polyvinylalcohols have different degrees of hydrolysis such that the rheology of the cement slurry capable of being formed from the composition is stable during temperatures changes.

15 Claims, No Drawings

ADDITIVE FOR CONTROLLING CEMENT SLURRY RHEOLOGY

TECHNICAL FIELD

This invention relates to cement slurries for use in oil wells, gas wells and the like. In particular the invention relates to the use of polyvinylalcohols as an additive to maintain the rheology of cement slurries.

BACKGROUND ART

In the drilling and completion of oil and gas wells, a cementing composition is often introduced into the wellbore for cementing pipe string or casing. In this process known as 'primary cementing', a cement slurry is pumped into the annular space between the walls of the wellbore and the casing. The cement slurry sets in the annular space, supporting and positioning the casing, and forming a substantially impermeable barrier or cement sheath, which isolates the wellbore into subterranean zones to prevent undesirable migration of fluids between such zones.

There are two main factors that contribute to ensuring zonal isolation during the life of a well. Specifically the cement should be placed in the entire annulus through efficient mud removal and the properties of the set cement should be optimized so that it can withstand the stresses from various operations that may be conducted during the life of the well.

If the short term properties of the cementing composition such as density, static gel strength, and rheology are designed as needed, the undesirable migration of fluids between zones is prevented immediately after primary cementing.

Poor zonal isolation results in fluid migration, e.g. water or gas may invade an oil-bearing zone, resulting eventually in a risk of blow out, or to a less severe but economically challenging problem such as water production (and the need to provide expensive water treatment surface facilities) or the loss of reserves and productions. Remedial work to repair a faulty cement job is expensive (in as much as it increases rig time and delays oil or gas production) and sometimes leads to irreparable harm to the hydrocarbon-bearing production.

In most cases poor zonal isolation results from poor mud removal. As the cement slurry rheology is a critical parameter in the process of mud displacement, the slurry should have a constant rheology when it is prepared and as it is being pumped into the well and placed in the area that is to be cemented. However as the temperature of the well increases with depth, the rheology of the cement slurry will change with the temperature changes.

Most of the polymers that are currently used in cement slurries are either water-soluble polymers that dissolve quickly at ambient temperatures or non-soluble polymers like latexes. In both cases when the bottom hole circulating temperature is significantly higher than ambient temperature the rheology of the cement slurry decreases significantly during the placement of the cement. The rheology of the slurry can be increased by adding more polymer so that the cement slurry will still have sufficient viscosity when exposed to the higher temperatures downhole. However this can lead to mixing problems when preparing the cement slurry composition due to the slurry then having very high viscosity at ambient temperatures.

Therefore it is an object of the invention to provide an additive for a cementing composition that will maintain a constant rheology independent of the temperature that the slurry is exposed to.

DISCLOSURE OF THE INVENTION

Accordingly a first aspect of the invention comprises a cement composition for use in a wellbore comprising a cement blend and at least two polyvinylalcohols wherein the polyvinylalcohols have different degrees of hydrolysis such that the rheology of the cement slurry capable of being formed from the composition is stable during temperatures changes. The two different types of polyvinylalcohols present in the composition allow the rheology of the cement slurry to remain constant, even during changes of temperatures in the wellbore that the slurry encounters during placement.

Preferably the composition can comprise at least one polyvinylalcohol soluble at room temperature and at least one polyvinylalcohol that is substantially insoluble a room temperature and begins to solubilise at higher temperatures. The room temperature soluble polyvinylalcohol will solubilise upon mixing of the slurry, however the polyvinylalcohol that is substantially insoluble at room temperature but soluble at high temperatures will not begin to solubilise until the temperature of the slurry increases, and may not be completely soluble until temperatures reach above 80° C.

Preferably the composition comprises at least one partially hydrolyzed polyvinylalcohol and at least one fully hydrolyzed polyvinylalcohol. The cement composition can comprise a polyvinylalcohol at 88% hydrolysis and a polyvinylalcohol at 99% hydrolysis. The partially hydrolyzed PVA is soluble at room temperature while the fully hydrolyzed PVA is not soluble until higher temperatures are reached.

The cement composition can comprise equal amounts by weight of cement of each of the polyvinylalcohol with different degrees of hydrolysis.

Preferably the composition comprises 0.75% bwoc of a polyvinylalcohol at 88% hydrolysis and 0.75% bwoc of a polyvinylalcohol at 99% hydrolysis.

A second aspect of the invention comprises a cement slurry comprising a cement composition as described above.

A third aspect of the invention comprises a method of cementing a wellbore comprising: preparing a cement slurry as described above at the surface of the wellbore; and pumping the cement slurry into the wellbore.

Preparing the slurry comprises selecting the polyvinylalcohols so as to provide a constant rheology for the slurry at different depths of the well.

MODE(S) FOR CARRYING OUT THE INVENTION

The cement composition of the invention comprises polyvinylalcohols (PVA) where the PVA used are selected to maintain a constant rheology for the slurry when the slurry undergoes temperatures changes such as when it is pumped from the wellbore surface to the bottom hole of the wellbore.

Polyvinylalcohol is commonly manufactured by hydrolysis whereby the acetate groups of polyvinylacetate (PVAc) are replaced with hydroxyl groups. The extent of hydrolysis will determine the amount of residual acetyl groups and this will affect the viscosity characteristics.

PVA is a water-soluble resin that dissolves easily in water, however the solubility of the PVA depends on the degree of polymerization and the degree of hydrolysis. The lower the degree of polymerization, the easier it is to dissolve in water, and generally partially hydrolyzed grades of PVA are easier to dissolve than fully hydrolyzed grades. The dissolution rate of PVA is also dependant on the temperature that the dissolution is carried out under. The higher the temperature the greater the rate of dissolution. In particular the partially hydrolyzed grades of PVA dissolve at room temperatures more easily than fully hydrolyzed grades, which do not dissolve easily at room temperatures. The dissolution rate of fully hydrolyzed grades of PVA varies according to the degree of crystallinity, but partially hydrolyzed grades show little susceptibility to heat treatment conditions.

The molecular weight of PVA is generally expressed in terms of solution viscosity and is typically classified as ultra low, low, medium and high viscosity, as indicated in Table 1. While the degree of hydrolysis is commonly denoted as super, fully, intermediate and partially hydrolyzed. Whereby partially hydrolyzed PVA is about 87-89% hydrolyzed, intermediately hydrolyzed PVA is about 91-96.5% hydrolyzed, fully hydrolyzed PVA is about 98-99% hydrolyzed and super hydrolyzed PVA is about 99.3-100% hydrolyzed.

TABLE 1

| Viscosity (in centipoises) | Viscosity Type | Degree of Polymerization | Average Molecular Weight Range |
| --- | --- | --- | --- |
| 3-4 cps | Ultra low | 150-300 | 13000-23000 |
| 5-6 cps | Low | 350-650 | 31000-50000 |
| 22-30 cps | Medium | 1000-1500 | 85000-124000 |
| 45-72 cps | High | 1600-2200 | 146000-186000 |

Therefore by selecting polyvinylalcohols having different degrees of hydrolysis, preferably, one being soluble at room temperature and at least one that does not become soluble till higher temperatures, this allows the viscosity of the slurry to be maintained as the temperature increases in the wellbore. The level of viscosity can be adjusted by adding more or less polymer or by selecting the molecular weight of the polymer.

The viscosity of the cement slurry at ambient temperatures can be controlled by selecting the degree of polymerization and the concentration of the partially hydrolyzed PVA. Optimum solubility occurs at 87-89% hydrolysis and grades of PVA in this range of hydrolysis exhibit a high degree of cold water solubility. This is particularly useful when designing extended slurries, which exhibit a very low plastic viscosity due to their low solid volume fractions.

The fully hydrolyzed PVA are insoluble in the cement slurry when mixed at an ambient temperature, and therefore will not affect the viscosity of the cement slurry at this stage. However as the temperature increases during placement of the slurry, the fully hydrolyzed PVA begins to dissolve. This counteracts the thinning of the slurry that occurs due to the increased temperatures, and allows the viscosity of the slurry to be maintained. Maintaining the viscosity of the slurry is particularly important when the bottom hole circulating temperature is high, to allow better mud removal, or when weighting agents are used, to prevent any settling of the agents.

When cementing a wellbore, water, a hydraulic cement, and an additive mixture containing the PVA mixture are mixed together to form a pumpable slurry. The slurry is then pumped down the wellbore to its desired location where it can harden. The PVA mixture can be a dry mixture and can be present in the dry cement blend, or may be added to the cement blend at the time of mixing. The invention is now exemplified by way of the following examples.

EXAMPLES

The properties of cement slurries are compared to show how different combinations of PVA can affect the rheology of a conventional slurry.

Cement slurry A is prepared using an additive mixture comprising 1.5% bwoc PVA at 88% hydrolysis, 0.15 gallons per sack of powder (12.5 ml/kg) of a conventional dispersant and 0.02 gallons per sack of powder (1.7 ml/kg) of a conventional retarder. A sack of powder is defined by analogy with sacks of cement as being a sack containing 45.359 kg of mixture, in other words 1 gps=0.0834 liters of additive per kg of mixture. Water, the additive mixture and cement powder are mixed together to form a slurry having a solid volume fraction of 41% and a density of 15.66 pounds per gallon (1882 kg/m$^3$).

Cement slurry B is prepared using an additive mixture comprising 0.75% bwoc PVA at 88% hydrolysis, 0.75% bwoc PVA at 99% hydrolysis, 0.15 gallons per sack of powder (12.5 ml/kg) of a conventional dispersant and 0.02 gallons per sack of powder (1.7 ml/kg) of a conventional retarder. Water, the additive mixture and cement powder are mixed together to form a slurry having a solid volume fraction of 41% and a density of 15.67 pounds per gallon (1883 kg/m$^3$).

Cement slurry C is prepared using an additive mixture comprising 0.75% bwoc PVA at 99% hydrolysis, 0.04 gallons per sack of powder (3.3 ml/kg) of a conventional dispersant and 0.02 gallons per sack of powder (1.7 ml/kg) of a conventional retarder. Water, the additive mixture and cement powder are mixed together to form a slurry have a solid volume fraction of 41% and a density of 15.65 pounds per gallon (1880 kg/m$^3$).

Once the slurries are prepared they are evaluated for API rheology after mixing at room temperature and at 85° C. The tests were performed using standard American Petroleum Institute (API) procedures. The data obtained is set forth in Table 2.

TABLE 2

| Slurry | A | B | C |
| --- | --- | --- | --- |
| PVA 88% Hydrolysis (% bwoc) | 1.5 | 0.75 | 0 |
| PVA 99% hydrolysis (% bwoc) | 0 | 0.75 | 1.5 |
| Dispersant (gps) | 0.15 (12.5 ml/kg) | 0.15 (12.5 ml/kg) | 0.04 (3.3 ml/kg) |
| Retarder (gps) | 0.02 (1.7 ml/kg) | 0.02 (1.7 ml/kg) | 0.02 (1.7 ml/kg) |
| Slurry density (ppg) | 15.66 (1882 kg/m$^3$) | 15.67 (1883 kg/m$^3$) | 15.65 (1880 kg/m$^3$) |
| Solid volume fraction (SVF %) | 41 | 41 | 41 |
| Rheology after mixing (room temperature) | | | |
| Plastic viscosity Pv (cP) | 242 (242 mPa · s) | 77 (77 mPa · s) | 31 (31 mPa · s) |
| Ty (lb/100 ft$^2$) | 6 (2.87 Pa) | 2 (0.96 Pa) | 3 (1.43 Pa) |
| API Rheology at 85° C. | | | |
| Plastic viscosity Pv (cP) | 77 (77 mPa · s) | 71 (71 mPa · s) | 258 (258 mPa · s) |
| Yield Point Ty (lb/100 ft$^2$) | 4 (1.92 Pa) | 3 (1.43 Pa) | 113 (54.1 Pa) |

As can be seen from Table 2 slurry B having a mixture of PVAs with different degrees of hydrolysis exhibits a rheological behaviour that is similar after mixing at room temperature and after coniditioning at 85° C. While the rheological behaviour for slurry A and slurry C is differ signficantly between room temperature and a temperature of 85° C.

For slurry B the PVA at 88% hydrolysis is soluble at room temperature and therefore affects the rheology of the slurry after mixing at room temperature. The PVA at 99% hydrolysis is insoluble at room temperature and therefore does not affect the viscosity of the slurry at the mixing stage. When the temperature increases the fully hydrolysed PVA can begin to dissolve in the slurry. When the PVA at 99% hydrolysis solubilizes in the cement slurry it maintains the viscosity of the slurry.

The invention claimed is:

1. A cement composition for use in a wellbore comprising a cement blend and at least two polyvinylalcohols, wherein the polyvinylalcohols have different degrees of hydrolysis such that the rheology of the cement slurry capable of being formed by the composition is stable during temperatures changes, wherein at least one polyvinylalcohol is soluble at room temperature, and at least one polyvinylalcohol is substantially insoluble at room temperature.

2. The cement composition according to claim 1 wherein the polyvinylalcohol that is substantially insoluble at room temperature is completely soluble at temperatures above 80° C.

3. The cement composition according to claim 1 comprising at least one partially hydrolyzed polyvinylalcohol and at least one fully hydrolyzed polyvinylalcohol.

4. The cement composition according to claim 1 comprising a polyvinylalcohol at 88% hydrolysis and a polyvinylalcohol at 99% hydrolysis.

5. The cement composition according claim 1 wherein the composition comprises equal amounts of each polyvinylalcohol having a different degree of hydrolysis.

6. The cement composition according to claim 5 wherein the composition comprises 0.75% bwoc of a polyvinylalcohol at 88% hydrolysis and a 0.75% bwoc of a polyvinylalcohol at 99% hydrolysis.

7. A cement slurry comprising water and the cement composition according to claim 1.

8. A method of cementing a wellbore comprising:
preparing a cement slurry at the surface of the wellbore comprising water and a cement composition that comprises a cement blend and at least two polyvinylalcohols that have different degrees of hydrolysis, wherein at least one polyvinylalcohol is soluble at room temperature and at least one polyvinylalcohol is substantially insoluble at room temperature; and
pumping the cement slurry into the wellbore.

9. The method according to claim 8 wherein preparing the slurry comprises selecting the polyvinylalcohols so as to provide a constant rheology for the slurry at different depths of the well.

10. A method for manufacturing a cement slurry having a stable rheology during temperature changes comprising:
mixing cement with at least two polyvinylalcohols wherein the polyvinylalcohols have different degrees of hydrolysis, wherein at least one polyvinylalcohol is soluble at room temperature and at least one polyvinylalcohol is substantially insoluble at room temperature; and
adding a sufficient amount of water to form the slurry.

11. The method of claim 10 wherein the polyvinylalcohol that is substantially insoluble at room temperature is completely soluble at temperatures above 80° C.

12. The method of claim 10 wherein at least one polyvinylalcohol is partially hydrolyzed and at least one polyvinylalcohol is fully hydrolyzed.

13. The method of claim 10 wherein at least a polyvinylalcohol at 88% hydrolysis and at least a polyvinylalcohol at 99% hydrolysis are used.

14. The method of claim 10 wherein each polyvinylalcohol having a different degree of hydrolysis is present in equal amounts.

15. The method of claim 14 wherein 0.75% bwoc of a polyvinylalcohol at 88% hydrolysis and a 0.75% bwoc of a polyvinylalcohol at 99% hydrolysis are mixed with cement.

* * * * *